US009202404B2

(12) United States Patent
Kimura et al.

(10) Patent No.: US 9,202,404 B2
(45) Date of Patent: Dec. 1, 2015

(54) DISPLAY APPARATUS, DISPLAY DRIVING APPARATUS, AND METHOD OF DRIVING THE DISPLAY APPARATUS

(75) Inventors: Hisashi Kimura, Yongin (KR); Chang-Wook Kang, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 579 days.

(21) Appl. No.: 12/913,878

(22) Filed: Oct. 28, 2010

(65) Prior Publication Data

US 2011/0199344 A1 Aug. 18, 2011

(30) Foreign Application Priority Data

Feb. 12, 2010 (KR) ........................ 10-2010-0013505

(51) Int. Cl.
*G06F 3/038* (2013.01)
*G09G 3/36* (2006.01)
*G09G 3/20* (2006.01)
*G09G 3/00* (2006.01)

(52) U.S. Cl.
CPC .................. *G09G 3/20* (2013.01); *G09G 3/006* (2013.01); *G09G 2310/0267* (2013.01); *G09G 2310/0275* (2013.01); *G09G 2310/08* (2013.01); *G09G 2330/08* (2013.01)

(58) Field of Classification Search
CPC .............. G09G 3/006; G09G 2330/08; G09G 2310/0286; G09G 2310/0289; G09G 2330/12
USPC ................. 345/204–215, 87–104; 315/169.2; 377/64–81; 324/760.01; 349/192
See application file for complete search history.

(56) References Cited

U.S. PATENT DOCUMENTS 5,465,053 A 11/1995 Edwards
5,781,171 A 7/1998 Kihara et al.
5,926,156 A * 7/1999 Katoh et al. .................... 345/55

(Continued)

FOREIGN PATENT DOCUMENTS

JP 2004287301 A 10/2004
JP 2004-361457 12/2004

(Continued)

OTHER PUBLICATIONS

The Extended European Search Report issued by the European Patent Office on Jun. 17, 2011, corresponding to the European Patent Application No. 10196997.0 is attached herewith.

(Continued)

*Primary Examiner* — Amr Awad
*Assistant Examiner* — Roberto Flores
(74) *Attorney, Agent, or Firm* — Robert E. Bushnell, Esq.

(57) ABSTRACT

A display driving apparatus for outputting control signals to a number of driver integrated circuits (ICs). The plurality of driver ICs are connected in a cascade manner such that, when a first control signal is input to a first driver IC, a transmission signal corresponding to the first control signal is transmitted to a subsequent driver IC using a cascade method. The display driving apparatus includes a restoration signal generation unit for generating restoration signals with respect to the first control signal and transmission signals of the number of driver ICs; an error detection unit for detecting an abnormal driver IC that does not operate normally from among the plurality of driver ICs; and a restoration signal output unit for outputting a restoration signal to the abnormal driver IC.

20 Claims, 12 Drawing Sheets

(56) References Cited

U.S. PATENT DOCUMENTS

| | | | | |
|---|---|---|---|---|
| 6,177,922 | B1 | 1/2001 | Schiefer et al. | |
| 6,236,393 | B1 * | 5/2001 | Ogawa et al. | 345/211 |
| 6,697,041 | B1 * | 2/2004 | Tamai et al. | 345/100 |
| 7,245,690 | B2 * | 7/2007 | Mutaguchi | 377/64 |
| 7,362,291 | B2 * | 4/2008 | Park | 345/87 |
| 7,636,077 | B2 * | 12/2009 | Wei et al. | 345/100 |
| 7,675,488 | B2 * | 3/2010 | Chen | 345/76 |
| 8,228,281 | B2 * | 7/2012 | Woo | 345/100 |
| 8,284,377 | B2 * | 10/2012 | Hsu et al. | 349/192 |
| 8,339,349 | B2 * | 12/2012 | Shin et al. | 345/98 |
| 2005/0052401 | A1 | 3/2005 | Lee | |
| 2005/0206606 | A1 * | 9/2005 | Takafuji et al. | 345/100 |
| 2005/0276369 | A1 * | 12/2005 | Mutaguchi | 377/64 |
| 2006/0256063 | A1 * | 11/2006 | An | 345/98 |
| 2006/0274021 | A1 * | 12/2006 | Park et al. | 345/100 |
| 2007/0085809 | A1 * | 4/2007 | Wei et al. | 345/100 |
| 2007/0097107 | A1 | 5/2007 | Furukoshi | |
| 2007/0132700 | A1 * | 6/2007 | Cho et al. | 345/100 |
| 2007/0164972 | A1 * | 7/2007 | Chang | 345/100 |
| 2007/0216634 | A1 * | 9/2007 | Kim et al. | 345/100 |
| 2008/0157810 | A1 * | 7/2008 | Yu et al. | 324/770 |
| 2008/0309605 | A1 * | 12/2008 | Jang et al. | 345/92 |
| 2009/0040197 | A1 * | 2/2009 | Scheibe | 345/204 |
| 2009/0115592 | A1 | 5/2009 | Miake et al. | |
| 2010/0090992 | A1 | 4/2010 | Lee | |
| 2010/0171726 | A1 * | 7/2010 | Chen et al. | 345/206 |
| 2011/0234574 | A1 | 9/2011 | Tanaka et al. | |

FOREIGN PATENT DOCUMENTS

| | | | |
|---|---|---|---|
| JP | 2004361457 | A | 12/2004 |
| JP | 2009003155 | | 1/2009 |
| JP | 2009-150928 | | 7/2009 |
| JP | 2010-107933 | A | 5/2010 |
| WO | 2007/037050 | A1 | 4/2007 |

OTHER PUBLICATIONS

Korean Notice of Allowance issued Apr. 5, 2012 in connection with Korean Patent Application Serial No. 10-2010-0013505 and Request for Entry of the Accompanying Office Action attached herewith.

Japanese Office Action issued on Apr. 28, 2015 in connection with corresponding Japanese application No. 2010-279770 and Request for Entry of the Accompanying Office Action attached herewith.

Japanese Office Action issued by JP Patent Office mailed on Apr. 28, 2015 in connection with Application Serial No. 2010-279770 with its English translation.

* cited by examiner

DISPLAY APPARATUS, DISPLAY DRIVING APPARATUS, AND METHOD OF DRIVING THE DISPLAY APPARATUS

CROSS-REFERENCE TO RELATED PATENT APPLICATION

This application claims the benefit of Korean Patent Application No. 10-2010-13505, filed on Feb. 12, 2010, in the Korean Intellectual Property Office, the disclosure of which is incorporated herein in its entirety by reference.

BACKGROUND OF THE INVENTION

1. Field of the Invention

The general inventive concept relates to a display apparatus.

2. Description of the Related Art

As a data driving unit converts input data into a data driving signal and a scan driving unit adjusts the luminance of each pixel by controlling scanning of each pixel, a display apparatus displays an image corresponding to the input data. The data driving unit and the scan driving unit may operate according to timings determined by using control signals output from a timing control unit.

The above information disclosed in this Related Art section is only for enhancement of understanding of the background of the invention and therefore it may contain information that does not form the prior art that is already known to a person of ordinary skill in the art.

SUMMARY OF THE INVENTION

Aspects of the present invention provide for a display apparatus using a plurality of driving integrated circuits (ICs) connected in a cascade manner and capable of preventing a problem caused when signals are not appropriately transmitted to driver ICs subsequent to a driver IC that has an error and thus operates abnormally, a display driving apparatus, and a method of driving the display apparatus.

According to an aspect of the present invention, there is provided a display driving apparatus for outputting control signals to a plurality of driver integrated circuits (ICs) connected in a cascade manner such that, when a first control signal is input to a first driver IC, a transmission signal corresponding to the first control signal is transmitted to a subsequent driver IC by using a cascade method, the display driving apparatus including a restoration signal generation unit for generating restoration signals with respect to the first control signal and transmission signals of the plurality of driver ICs; an error detection unit for detecting an abnormal driver IC that does not operate normally from among the plurality of driver ICs; and a restoration signal output unit for outputting a restoration signal to the abnormal driver IC.

The restoration signal generation unit may generate the restoration signals to have the same timings as the first control signal and the transmission signals of the plurality of driver ICs. Also, the restoration signal generation unit may generate the restoration signals based on at least one or a combination of a vertical synchronization signal, a horizontal synchronization signal, and the first control signal.

The error detection unit may include a transmission signal detection unit for detecting the transmission signals separately output from the plurality of driver ICs; and a comparison unit for comparing the detected transmission signals and the restoration signals so as to detect the abnormal driver IC. The comparison unit may determine a driver IC of which a transmission signal and a restoration signal are different from each other, as the abnormal driver IC.

The apparatus may further include a timing generation unit for generating and applying the first control signal to the first driver IC. The timing generation unit may generate the first control signal based on a vertical synchronization signal and a horizontal synchronization signal, and the restoration signal generation unit may generate the restoration signals based on at least one or a combination of the vertical synchronization signal, the horizontal synchronization signal, and the first control signal.

The restoration signal generation unit may generate the restoration signals further based on previously stored driving information representing an operation environment of the display driving apparatus, and the display driving apparatus may further include a register for storing the driving information.

Furthermore, the apparatus may further include a substitution display control unit for controlling display data of the abnormal driver IC to be output by at least one normal driver IC other than the abnormal driver IC.

For example, the plurality of driver ICs may be driver ICs of a data driver unit, and the first control signal may be a horizontal synchronization start signal. As another example, the plurality of driver ICs may be driver ICs of a scan driver unit, and the first control signal may be a vertical synchronization start signal.

The apparatus may further include a cascade direction changing unit for changing a cascade direction of the plurality of driver ICs.

The apparatus may further include the plurality of driver ICs connected in a cascade manner such that, when a first control signal is input to a first driver IC, a transmission signal corresponding to the first control signal is transmitted to a subsequent driver IC by using a cascade method.

According to another aspect of the present invention, there is provided a display apparatus including a display unit including a plurality of pixels each including at least one light emitting element and a pixel circuit; a timing generation unit for generating and outputting a first control signal; a driver circuit unit including a plurality of driver integrated circuits (ICs) connected in a cascade manner such that, when the first control signal is input to a first driver IC, a transmission signal corresponding to the first control signal is transmitted to a subsequent driver IC by using a cascade method, and outputting driving signals to the plurality of pixels via the plurality of driver ICs; a restoration signal generation unit for generating restoration signals with respect to the first control signal and transmission signals of the plurality of driver ICs; an error detection unit for detecting an abnormal driver IC that does not operate normally from among the plurality of driver ICs; and a restoration signal output unit for outputting a restoration signal to the abnormal driver IC.

According to another aspect of the present invention, there is provided a method of driving a display apparatus, the display apparatus including a plurality of driver integrated circuits (ICs) connected in a cascade manner such that, when a first control signal is input to a first driver IC, a transmission signal corresponding to the first control signal is transmitted to a subsequent driver IC by using a cascade method, and the method including generating restoration signals with respect to the first control signal and transmission signals of the plurality of driver ICs; detecting an abnormal driver IC that does not operate normally from among the plurality of driver ICs; and outputting a restoration signal to the abnormal driver IC.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
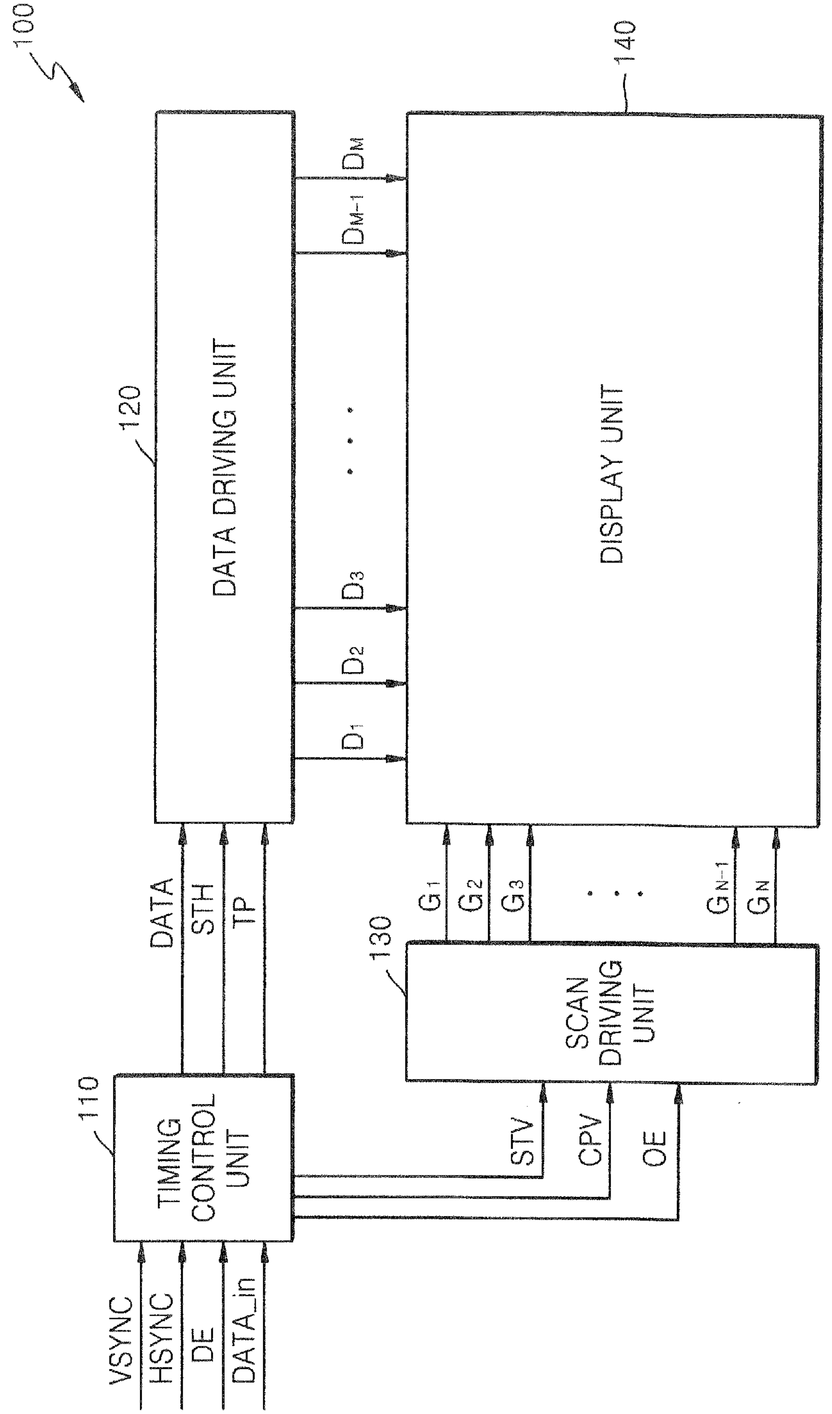
FIG. 1 is a schematic structural diagram of a display apparatus according to an embodiment of the present invention.

The following descriptions and the attached drawings are provided to understand operations of the present invention and some operations that can be easily realized by one of ordinary skill in the art may not be described.

Also, the present specification and the drawings are not provided to limit the scope of the invention which should be defined by the following claims. Terms used herein should be construed as having meanings and concepts corresponding to the technical idea of the present invention in order to the most appropriately describe the invention.

As those skilled in the art would realize, the described embodiments may be modified in various different ways, all without departing from the spirit or scope of the principles for the present invention.

Recognizing that sizes and thicknesses of constituent members shown in the accompanying drawings are arbitrarily given for better understanding and ease of description, the present invention is not limited to the illustrated sizes and thicknesses.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. Alternatively, when an element is referred to as being "directly on" another element, there are no intervening elements present.

In order to clarify the present invention, elements extrinsic to the description are omitted from the details of this description, and like reference numerals refer to like elements throughout the specification.

In several exemplary embodiments, constituent elements having the same configuration are representatively described in a first exemplary embodiment by using the same reference numeral and only constituent elements other than the constituent elements described in the first exemplary embodiment will be described in other embodiments.

Hereinafter, the present invention will be described in detail by explaining embodiments of the invention with reference to the attached drawings.

FIG. 1 is a schematic structural diagram of a display apparatus 100 according to an embodiment of the present invention.

Referring to FIG. 1, the display apparatus 100 includes a timing control unit 110, a data driving unit 120, a scan driving unit 130, and a display unit 140.

The timing control unit 110 receives a vertical synchronization signal VSYNC, a horizontal synchronization signal HSYNC, a data enable signal DE, and an image data signal DATA_in, converts the image data signal DATA_in according to specifications of the data driving unit 120, and outputs an RGB data signal DATA to the data driving unit 120. Also, the timing control unit 110 may generate and output to the data driving unit 120 a horizontal synchronization start signal STH and a load signal TP for providing a reference timing for outputting first through Mth data voltages D1 through DM from the data driving unit 120 to the display unit 140.

In addition, the timing control unit 110 outputs to the scan driving unit 130 a vertical synchronization start signal STV for selecting a first scan line, a gate clock signal CPV for sequentially selecting subsequent gate lines, and an output enable signal OE for controlling an output of the scan driving unit 130.

The data driving unit 120 includes a plurality of data driver ICs, receives the RGB data signal DATA and control signals such as the horizontal synchronization start signal STH and the load signal TP input from the timing control unit 110, and generates the first through Mth data voltages D1 through DM for data lines. The generated first through Mth data voltages D1 through DM are output to pixels of the display unit 140 via the data lines.

The scan driving unit 130 includes a plurality of scan driver ICs and generates first through Nth scan signals G1 through GN for scan lines of the display unit 140 according to control signals such as the gate clock signal CPV, the vertical synchronization start signal STV, and the output enable signal OE provided from the timing control unit 110. The generated first through Nth scan signals G1 through GN are output to pixels of the display unit 140 via the scan lines.

The display unit 140 includes the pixels formed in regions where the data lines cross the scan lines. The pixels each include a light emitting element and a driver circuit and are driven by the first through Nth scan signals G1 through GN and the first through Mth data voltages D1 through DM. The driver circuit outputs a light emitting driving current or voltage to the light emitting element in response to the first through Nth scan signals G1 through GN and the first through Mth data voltages D1 through DM, and the light emitting element emits light having a luminance corresponding to input data in response to the light emitting driving current or voltage. The structure of the pixels may differ according to the type of the display apparatus 100. The light emitting element may be, for example, an organic light emitting diode (OLED) or a liquid crystal diode (LCD). Also, the display apparatus 100 may be a plasma display panel (PDP).

Figure 2:
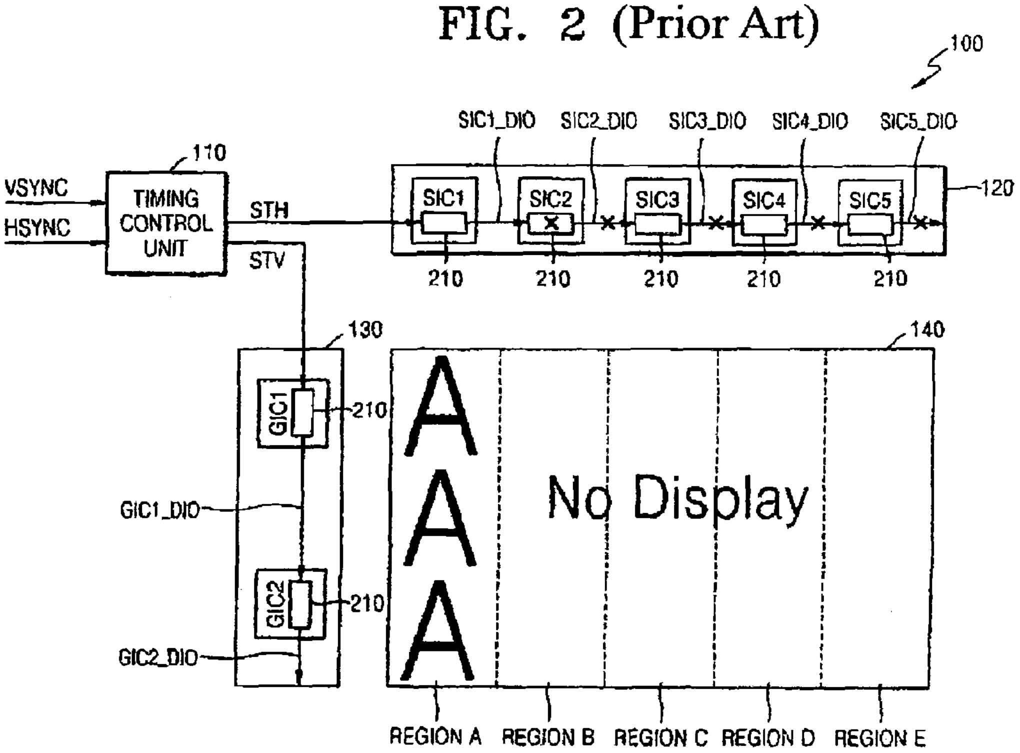
FIG. 2 (Prior Art)
FIGS. 2 and 3 are diagrams for describing problems of a related art.
Figure 3:
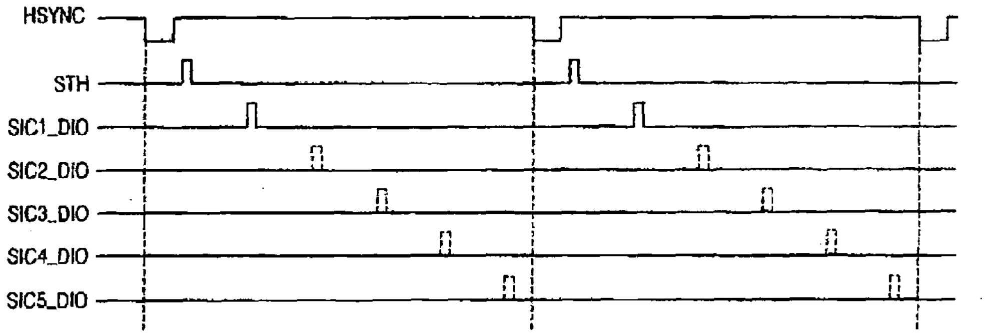
FIG. 3 (Prior Art)

FIGS. 2 and 3 are diagrams for describing problems of a related art. For convenience of explanation, FIGS. 2 and 3 will be described in conjunction with FIG. 1.

Referring to FIGS. 2 and 3, the data driving unit 120 may include first through fifth data driver ICs, SIC1 through SIC5, that are connected in a cascade manner and transmit signals by using a cascade method. Also, the scan driving unit 130 may include first and second scan driver ICs, GIC1 and GIC2, that are connected in a cascade manner and transmit signals by using a cascade method. For example, if a horizontal synchronization start signal STH is output to the first data driver IC SIC1 of the data driving unit 120, delays are caused by delay circuits 210 of the first through fifth data driver ICs SIC1 through SIC5, and first through fourth transmission signals, SIC1_DIO through SIC4_DIO, may be sequentially output to the second through fifth data driver ICs SIC2 through SIC5. The first through fifth data driver ICs SIC1 through SIC5 are respectively enabled in response to the horizontal synchronization start signal STH and the first through fourth transmission signals SIC1_DIO through SIC4_DIO.

However, if the second data driver IC SIC2 does not operate normally, the second transmission signal SIC2_DIO is not output from the second data driver IC SIC2 and thus, as illustrated in FIG. 3, the third and fourth data driver ICs, SIC3 and SIC4, subsequent to the second data driver IC SIC2 do not output the third and fourth transmission signals, SIC3_DIO and SIC4_DIO. As such, the third through fifth data driver ICs, SIC3 through SIC5, in a normal state as well as the second data driver IC SIC2 in an abnormal state are not enabled and thus all driver ICs subsequent to a data driver IC in an abnormal state may not operate. Accordingly, due to an error of the second data driver IC SIC2, data driving signals are not output to pixel regions driven by the third through fifth data driver ICs, SIC3 through SIC5, (Regions C through E) as well as a pixel region driven by the second data driver IC SIC2 (Region B) and thus an image is not displayed in Regions B through E.

Figure 4:
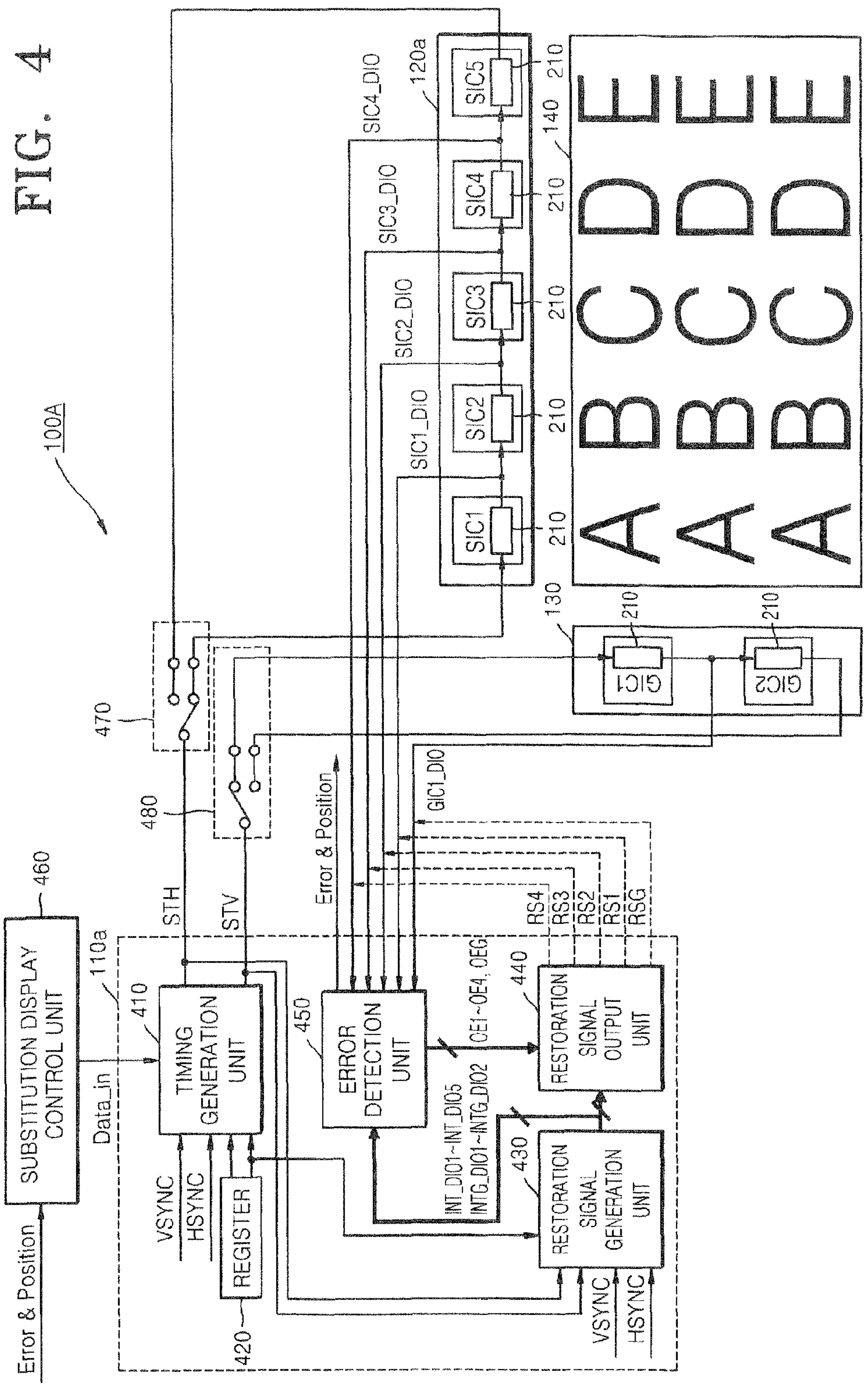
FIG. 4 is a structural diagram of a display apparatus according to an embodiment of the present invention.

FIG. 4 is a structural diagram of a display apparatus 100A according to an embodiment of the present invention.

Referring to FIG. 4, in the display apparatus 100A including a plurality of driver ICs connected in a cascade manner, for example, first through fifth data driver ICs, SIC1 through SIC5, and first and second scan driver ICs, GIC1 and GIC2, an abnormal driver IC is detected by detecting first through fifth transmission signals, SIC1_DIO through SIC5_DIO, respectively output from the first through fifth data driver ICs, SIC1 through SIC5, and first and second gate transmission signals, GIC1_DIO and GIC2_DIO, output from the first and second scan driver ICs, GIC1 and GIC2, a restoration signal is output to an output terminal of the abnormal driver IC via one of first through fourth restoration signal output lines, RS1 through RS4, and a first gate restoration signal output line RSG, and thus pixel regions other than a pixel region corresponding to the abnormal driver IC operate normally. Although the first through fourth transmission signals, SIC1_DIO through SIC4_DIO, and the first gate transmission signal GIC1_DIO are detected in FIGS. 4 and 7, according to another embodiment of the present invention, the fifth transmission signal SIC5_DIO and the second gate transmission signal GIC2_DIO may be further detected. Hereinafter, it is assumed that the first through fifth transmission signals, SIC1_DIO through SIC5_DIO, and the first and second gate transmission signals, GIC1_DIO and GIC2_DIO, are detected.

In FIG. 4, a timing control unit 110*a* includes a timing generation unit 410, a register 420, a restoration signal generation unit 430, a restoration signal output unit 440, an error detection unit 450, a substitution display control unit 460, a horizontal cascade direction changing unit 470, and a vertical cascade direction changing unit 480. Although the restoration signal generation unit 430, the restoration signal output unit 440, and the error detection unit 450 are included in the timing control unit 110*a* in FIG. 4, the current embodiment is not limited thereto and the restoration signal generation unit 430, the restoration signal output unit 440, and the error detection unit 450 may be included in a data driving unit 120*a* and/or a scan driving unit 130, or may form an additional circuit unit.

The timing generation unit 410 performs the above-described general operation of the timing control unit 110 illustrated in FIG. 1. In more detail, the timing generation unit 410 generates and outputs a vertical synchronization start signal STV and a horizontal synchronization start signal STH from a vertical synchronization signal VSYNC and a horizontal synchronization signal HSYNC. Timings of the vertical synchronization start signal STV and the horizontal synchronization start signal STH may be respectively determined by using the vertical synchronization signal VSYNC and the horizontal synchronization signal HSYNC. In this case, the timing generation unit 410 may generate the vertical synchronization start signal STV and the horizontal synchronization start signal STH based on driving information previously stored in the register 420. The previously stored driving information is information representing an operation environment of the display apparatus 100A and may represent a resolution, the number of data driver ICs, the number of scan driver ICs and the like. The vertical synchronization start signal STV is output to the scan driving unit 130 and the horizontal synchronization start signal STH is output to the data driving unit 120*a*.

The display apparatus 100A includes the horizontal cascade direction changing unit 470 and the vertical cascade direction changing unit 480 in order to change a cascade direction. The vertical synchronization start signal STV is output to the first or last scan driver IC of the scan driving unit 130, i.e., the first scan driver IC GIC1 or the second scan driver IC GIC2, by the control of the vertical cascade direction changing unit 480. The horizontal synchronization start signal STH may be output to the first or last data driver IC of the data driving unit 120*a*, i.e., the first data driver IC SIC1 or the fifth data driver IC SIC5, by the control of the horizontal cascade direction changing unit 470. The horizontal cascade direction changing unit 470 and the vertical cascade direction changing unit 480 may be, for example, switching devices as illustrated in FIG. 4.

The restoration signal generation unit 430 may generate the first through fifth restoration signals, INT_DIO1 through INT_DIO5, and first and second gate restoration signals, INTG_DIO1 through INTG_DIO2, based on the vertical synchronization signal VSYNC and the horizontal synchronization signal HSYNC input to the timing generation unit 410, the driving information previously stored in the register 420, and the vertical synchronization start signal STV and the horizontal synchronization start signal STH output from the timing generation unit 410.

Alternatively, the restoration signal generation unit 430 may not generate the fifth restoration signal INT_DIO5 for the fifth data driver IC SIC5 of the data driving unit 120*a* and the second gate restoration signal INTG_DIO2 for the second scan driver IC GIC2 of the scan driving unit 130.

Hereinafter, for convenience of explanation, the first through fifth transmission signals, SIC1_DIO through SIC5_DIO, and the first through fifth restoration signals, INT_DIO1 through INT_DIO5, of the data driving unit 120*a* will be representatively described. The first and second gate transmission signals, GIC1_DIO and GIC2_DIO, and the first and second gate restoration signals, INTG_DIO1 and INTG_DIO2, of the scan driving unit 130 may be generated and driven based on the vertical synchronization signal VSYNC, the vertical synchronization start signal STV, and the driving information previously stored in the register 420 by using the same method used in the data driving unit 120*a*.

Figure 5:
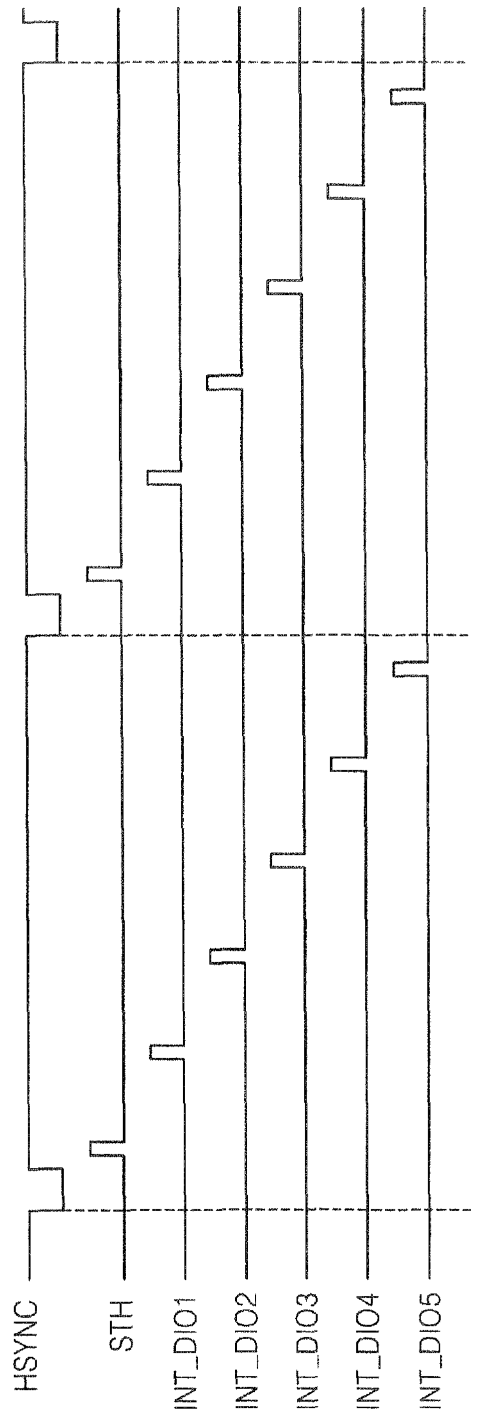
FIG. 5 is a timing diagram of restoration signals for a plurality of data driver ICs illustrated in FIG. 4, according to an embodiment of the present invention.

FIG. 5 is a timing diagram of the first through fifth restoration signals, INT_DIO1 through INT_DIO5, for the first through fifth data driver ICs SIC1 through SIC5 illustrated in FIG. 4, according to an embodiment of the present invention.

Referring to FIG. 5, the first through fifth restoration signals, INT_DIO1 through INT_DIO5, for the first through fifth data driver ICs, SIC1 through SIC5, may have the same waveforms as the first through fifth transmission signals, SIC1_DIO through SICS_DIO. Also, the first through fifth restoration signals, INT_DIO1 through INT_DIO5, are generated based on the horizontal synchronization start signal HSYNC and thus are generated to have the same timings as the first through fifth transmission signals, SIC1_DIO through SIC5_DIO.

The first through fifth restoration signals, INT_DIO1 through INT_DIO5, generated by the restoration signal generation unit 430 are output to the restoration signal output unit 440 and the error detection unit 450.

The error detection unit 450 detects an abnormal driver IC based on the first through fifth transmission signals, SIC1_DIO through SIC5_DIO, and the first through fifth restoration signals, INT_DIO1 through INT_DIO5. The error detection unit 450 compares the first through fifth transmission signals, SIC1_DIO through SIC5_DIO, and the first through fifth restoration signals, INT_DIO1 through INT_DIO5, with respect to the first through fifth data driver ICs, SIC1 through SIC5, and determines a data driver IC of which a transmission signal is different from a restoration signal, as an abnormal driver IC.

Figure 6:
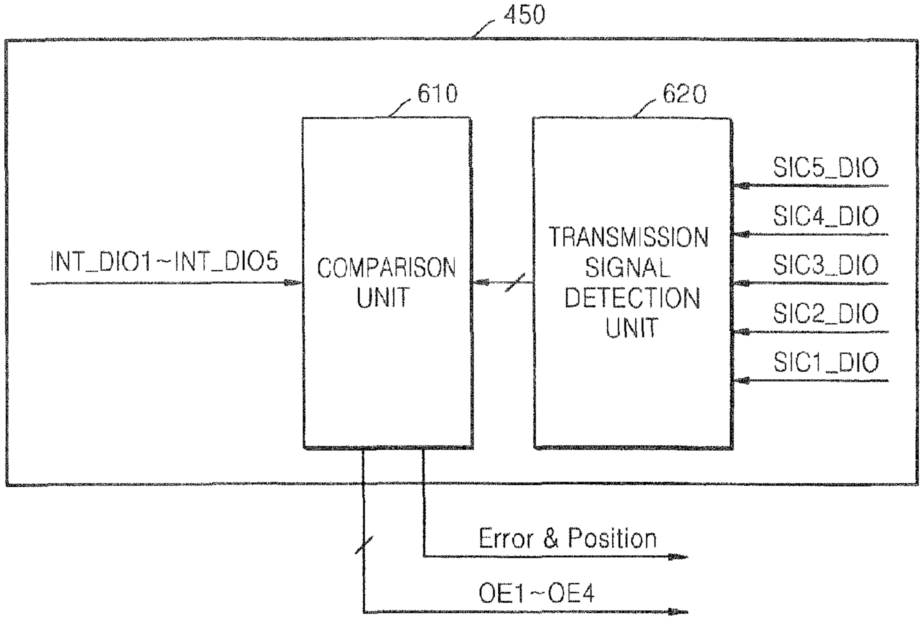
FIG. 6 is a structural diagram of an error detection unit illustrated in FIG. 4, according to an embodiment of the present invention.

FIG. 6 is a structural diagram of the error detection unit 450 illustrated in FIG. 4, according to an embodiment of the present invention.

Referring to FIG. 6, the error detection unit 450 may include a comparison unit 610 and a transmission signal detection unit 620.

The transmission signal detection unit 620 detects the first through fifth transmission signals, SIC1_DIO through SIC5_DIO, from the first through fifth data driver ICs, SIC1 through SIC5, and transmits the first through fifth transmission signals, SIC1_DIO through SIC5_DIO, to the comparison unit 610.

The comparison unit 610 compares the first through fifth transmission signals, SIC1_DIO through SIC5_DIO, and the first through fifth restoration signals, INT_DIO1 through INT_DIO5, with respect to the first through fifth data driver ICs, SIC1 through SIC5, and detects an abnormal driver IC of which a transmission signal is different from a restoration signal. For this, the comparison unit 610 may include at least one comparison circuit (not shown). The comparison unit 610 outputs first through fourth restoration signal enable signals, OE1 through OE4, corresponding to the first through fourth data driver ICs, SIC1 through SIC4, to the restoration signal output unit 440. In FIG. 4, OEG represents a first gate restoration signal enable signal for the first scan driver IC GIC1. The comparison unit 610 may set a restoration signal enable signal corresponding to a normal driver IC as a logic low level and a restoration signal enable signal corresponding to an abnormal driver IC as a logic high level. Also, the comparison unit 610 may output abnormal driver IC information Error & Position representing whether an abnormal driver IC exists and the location of an abnormal driver IC.

The restoration signal output unit 440 outputs a restoration signal to the abnormal driver IC via the first through fourth restoration signal output lines RS1 through RS4 and the first gate restoration signal output line RSG. The restoration signal output unit 440 receives the first through fourth restoration signal enable signals, OE1 through OE4, and the first gate restoration signal enable signal OEG output from the error detection unit 450, and a restoration signal corresponding to a restoration signal enable signal activated in a logic high level to an output terminal of the abnormal driver IC via the first through fourth restoration signal output lines, RS1 through RS4, and the first gate restoration signal output line RSG. The restoration signal output unit 440 may be, for example, a 3-state output buffer.

Figure 7:
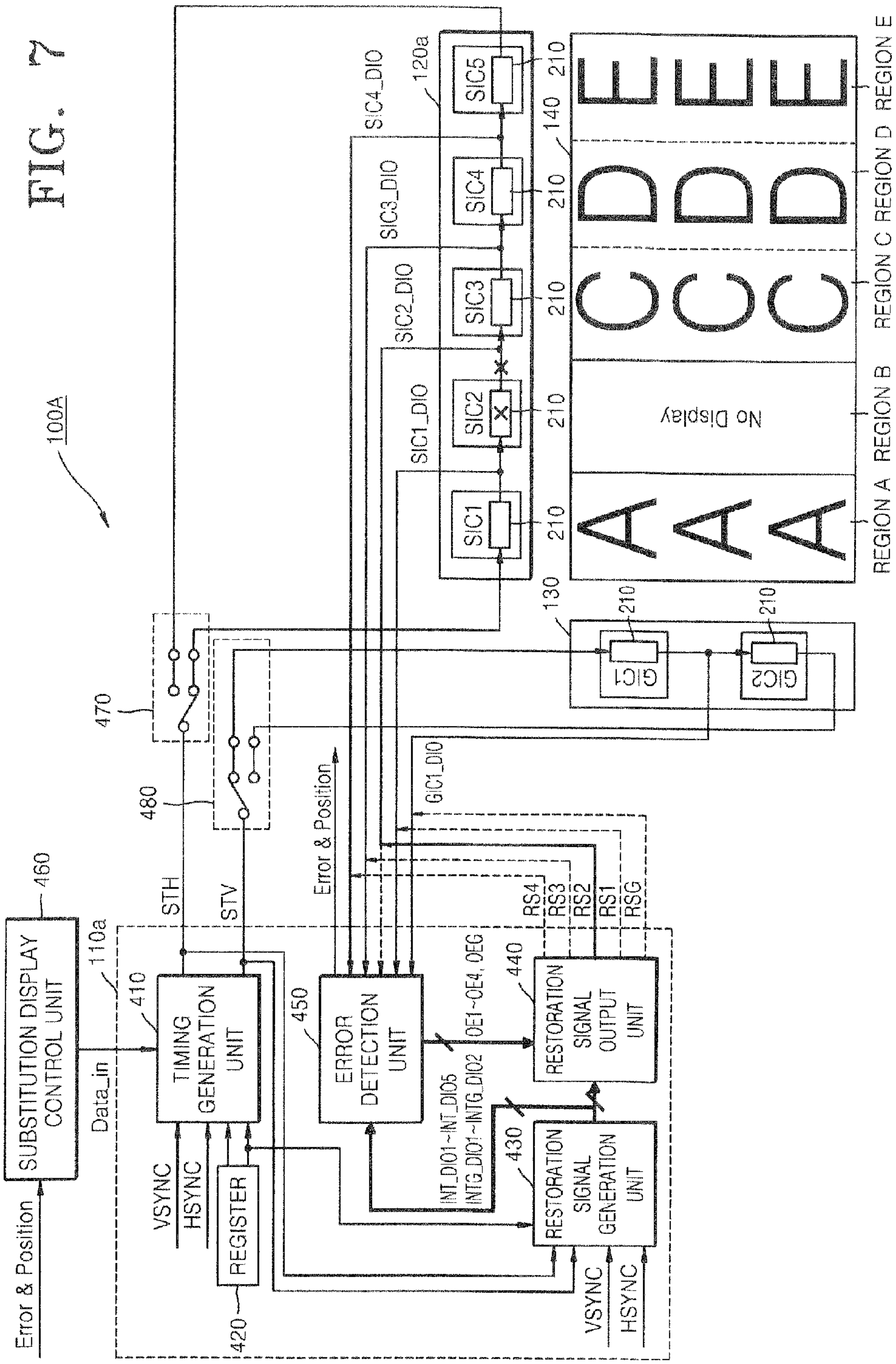
FIGS. 7 through 9 are diagrams showing a driving of the display apparatus illustrated in FIG. 4, according to an embodiment of the present invention.
Figure 8:
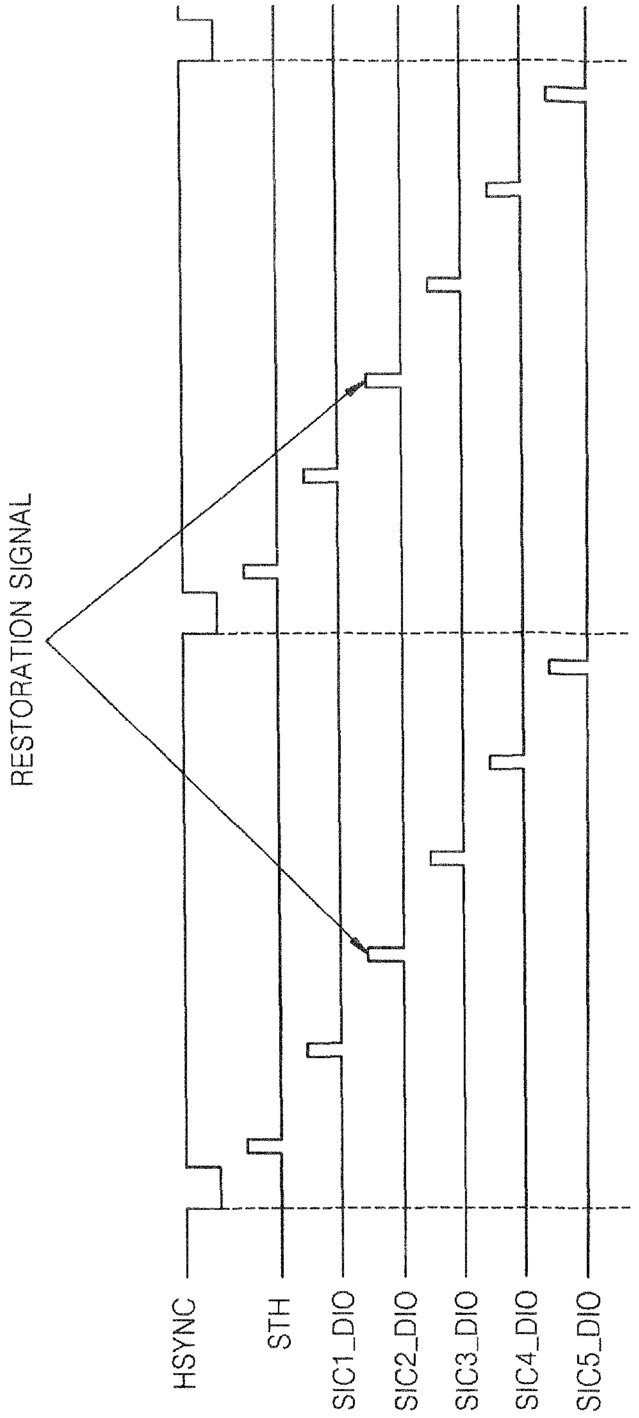
Figure 9:
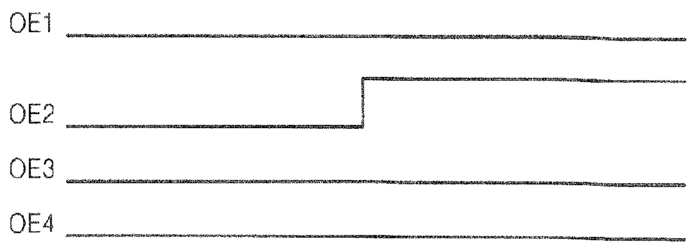

FIGS. 7 through 9 are diagrams showing a driving of the display apparatus 100A illustrated in FIG. 4, according to an embodiment of the present invention.

Referring to FIGS. 7 through 9, if the second data driver IC SIC2 is in an abnormal state, as illustrated in FIG. 7, the second restoration signal enable signal OE2 corresponding to the second data driver IC SIC2 transits to a logic high level, as illustrated in FIG. 9. As such, the second restoration signal INT_DIO2 corresponding to the second transmission signal SIC2_DIO is output to an output terminal of the second data driver IC SIC2. In this case, the restoration signal output unit 440 sets the first, third, and fourth restoration signal output lines RS1, RS3, and RS4 and the first gate restoration signal output line RSG corresponding to normal driver ICs, as a high impedance state, and may output the second restoration signal INT_DIO2 to only the second restoration signal output line RS2 for an abnormal driver IC, i.e., a driver IC of which a restoration signal enable signal is in a logic high level. Since the display apparatus 100A transmits transmission signals to third through fifth data driver ICs, SIC3 through SICS, by using the second restoration signal INT_DIO2 even when the second data driver IC SIC2 is in an abnormal state, as illustrated in FIG. 8, transmission signals are normally transmitted to all driver ICs. Also, as illustrated in FIG. 7, except for a pixel region (Region B) driven by the second data driver IC SIC2 in an abnormal state, all pixel regions (Regions A, C, D and E) may operate normally.

The substitution display control unit 460 processes and outputs input image data Data_in to the timing generation unit 410 such that data to be displayed in a pixel region driven by an abnormal driver IC is displayed in a pixel region driven by at least one normal driver IC other than the abnormal driver IC.

Figure 10:
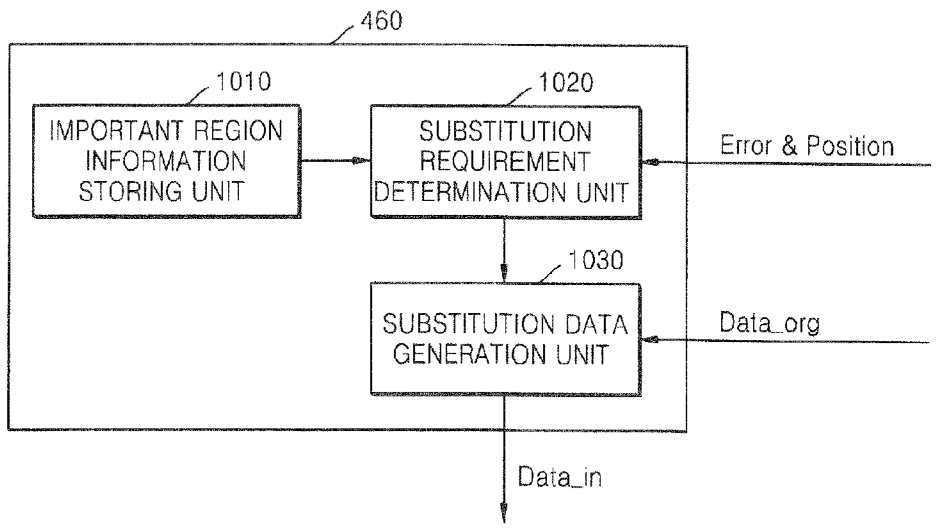
FIG. 10 is a structural diagram of a substitution display control unit illustrated in FIG. 4, according to an embodiment of the present invention.

FIG. 10 is a structural diagram of the substitution display control unit 460 illustrated in FIG. 4, according to an embodiment of the present invention.

Referring to FIG. 10, the substitution display control unit 460 may display data of a pixel region driven by an abnormal driver IC in a pixel region driven by at least one normal driver IC only if the pixel region driven by the abnormal driver IC is a region for displaying important data. The substitution display control unit 460 may include an important region information storing unit 1010, a substitution requirement determination unit 1020 and a substitution data generation unit 1030.

The important region information storing unit 1010 stores information regarding important regions for displaying important data. For example, a display apparatus in an instrument panel of a vehicle displays important data such as a current speed and a rev count of an engine. However, if a driver IC for driving a pixel region for displaying the current speed has an error, a driver may not obtain data regarding the current speed and may be susceptible to danger. On the other hand, data such as an accumulated mileage does not cause a serious problem to a driver even when the data is not currently displayed. Accordingly, information regarding an important region for displaying important data such as a current speed is previously stored in the important region information storing unit 1010.

Furthermore, the important region information storing unit 1010 may further store information regarding substitution regions for substitutive display of data if the data is not displayable in an important region. For example, it is assumed that Region B may not display data due to an abnormal operation of the second data driver IC SIC2, and is an important region for displaying a current speed, and thus the data of Region B has to be displayed in another region. The data of Region B may be substitutively displayed in a certain region, for example, Region C. However, if Region C is a region for displaying a rev count of an engine and thus is another important region, the rev count of an engine may not be displayed in order to display the current speed. Accordingly, the important region information storing unit 1010 may previously store information regarding substitution regions that substitute for important regions.

The substitution requirement determination unit 1020 receives abnormal driver IC information Error & Position from the error detection unit 450 and determines whether a pixel region driven by the abnormal driver IC is an important region. In this case, the substitution requirement determination unit 1020 may determine based on information regarding important regions, which is previously stored in the important region information storing unit 1010. Also, if the pixel region driven by the abnormal driver IC is an important region, the substitution requirement determination unit 1020 may determine a substitution region for the substitutive display of data to be displayed in the important region and may output information regarding the substitution region to the substitution data generation unit 1030.

For example, the substitution region may be selected from among pixel regions that are driven by normal driver ICs and are not important regions. As another example, as described above in relation to FIG. 4, the substitution region may be selected based on the information regarding substitution regions, which is previously stored in the important region information storing unit 1010.

If the pixel region driven by the abnormal driver IC is an important region, the substitution data generation unit 1030 modifies original input image data Data_org such that data to be displayed in the important region driven by the abnormal driver IC is displayed in the substitution region, and outputs the modified data to the timing generation unit 410. If the pixel region driven by the abnormal driver IC is not an important region, the substitution data generation unit 1030 may bypass the original input image data Data_org.

Figure 11:
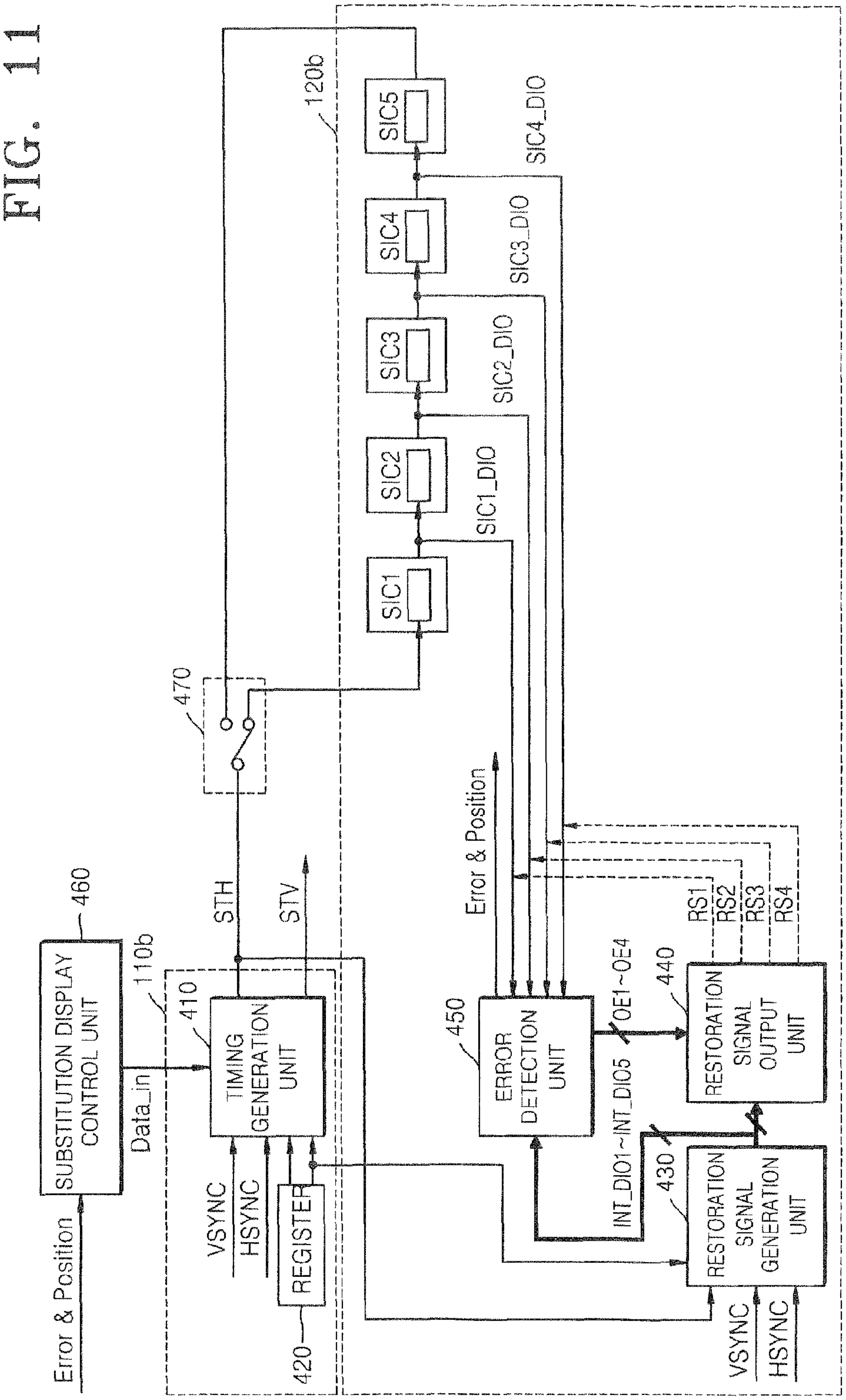
FIG. 11 is a structural diagram of a timing control unit and a data driving unit, according to another embodiment of the present invention.

FIG. 11 is a structural diagram of a timing control unit 110*b* and a data driving unit 120*b*, according to another embodiment of the present invention. FIG. 11 will be described in conjunction with FIG. 4.

Referring to FIG. 11, the restoration signal generation unit 430, the restoration signal output unit 440 and the error detection unit 450 may be separately included in the data driving unit 120*b* and the scan driving unit 130. In this case, the restoration signal generation unit 430, the restoration signal output unit 440, and the error detection unit 450 respectively perform restoration signal generation, restoration signal output, and error detection on only the first through fifth transmission signals, SIC1_DIO through SIC5_DIO, output from the first through fifth data driver ICs SIC1 through SIC5 of the data driving unit 120*b*, and components for performing restoration signal generation, restoration signal output, and error detection may be additionally included in the scan driving unit 130.

Alternatively, the restoration signal generation unit 430, the restoration signal output unit 440, and the error detection unit 450 may be included in one of the data driving unit 120*b* and the scan driving unit 130 and thus may respectively perform restoration signal generation, restoration signal output, and error detection with respect to both the data driving unit 120*b* and the scan driving unit 130.

Figure 12:
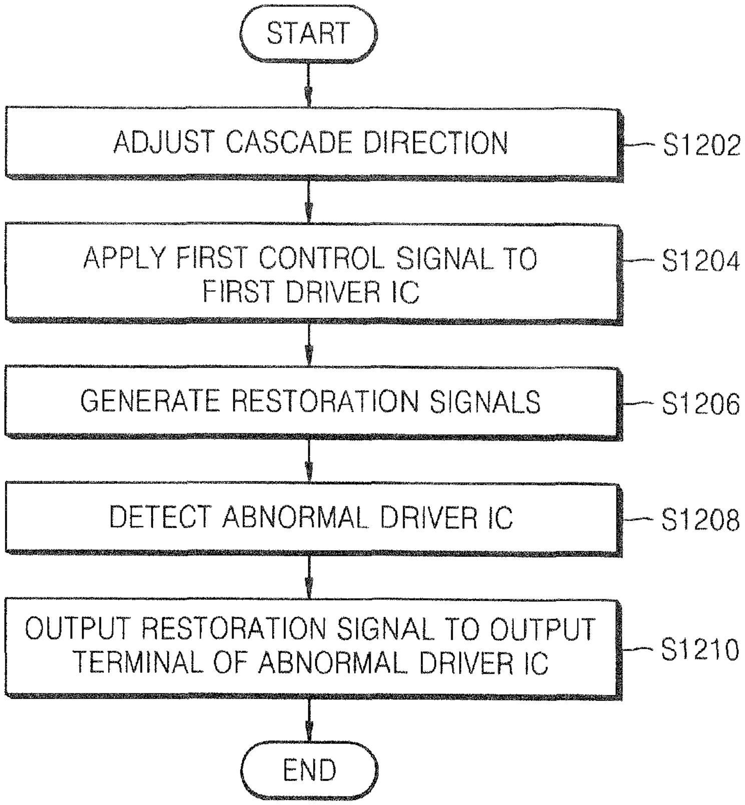
FIG. 12 is a flowchart of a method of driving a display apparatus, according to an embodiment of the present invention.

FIG. 12 is a flowchart of a method of driving the display apparatus 100A, according to an embodiment of the present invention.

Referring to FIG. 12, a cascade direction of a plurality of driver ICs of the data driving unit 120 and the scan driving unit 130 may be adjusted (S1202). The cascade direction of the data driving unit 120*a* and the scan driving unit 130 may be changed to control a direction or order for displaying data. Alternatively, the cascade direction may be changed to cope with an error of a driver IC. In the entire method, the changing of the cascade direction is not limited to being performed in operation S1202 and may be performed later.

A first control signal is applied to a first driver IC from among the plurality of driver ICs connected in a cascade manner (S1204). If the first control signal is a horizontal synchronization start signal STH to be applied to the first data driver IC SIC1 of the data driving unit 120*a*, the first control signal may be generated by using a horizontal synchronization signal HSYNC and previously stored driving information regarding the display apparatus 100A. If the first control signal is a vertical synchronization start signal STV to be applied to the first scan driver IC GIC1 of the scan driving unit 130, the first control signal may be generated by using a vertical synchronization signal VSYNC and the previously stored driving information regarding the display apparatus 100A.

Also, restoration signals having the same waveforms as transmission signals transmitted from the plurality of driver ICs are generated (S1206). If the first control signal is the horizontal synchronization start signal STH to be applied to the first data driver IC SIC1 of the data driving unit 120*a*, restoration signals for the first through fifth data driver ICs SIC1 through SIC5 of the data driving unit 120*a* may be generated based on the horizontal synchronization signal HSYNC, the horizontal synchronization start signal STH, and the previously stored driving information regarding the display apparatus 100A. If the first control signal is the vertical synchronization start signal STV to be applied to the first scan driver IC GIC1 of the scan driving unit 130, restoration signals for the first and second scan driver ICs GIC1 and GIC2 of the scan driving unit 130 may be generated based on the vertical synchronization signal VSYNC, the vertical synchronization start signal STV, and the previously stored driving information regarding the display apparatus 100A.

Then, an abnormal driver IC is detected by comparing the restoration signals and detected transmission signals (S1208).

Figure 13:
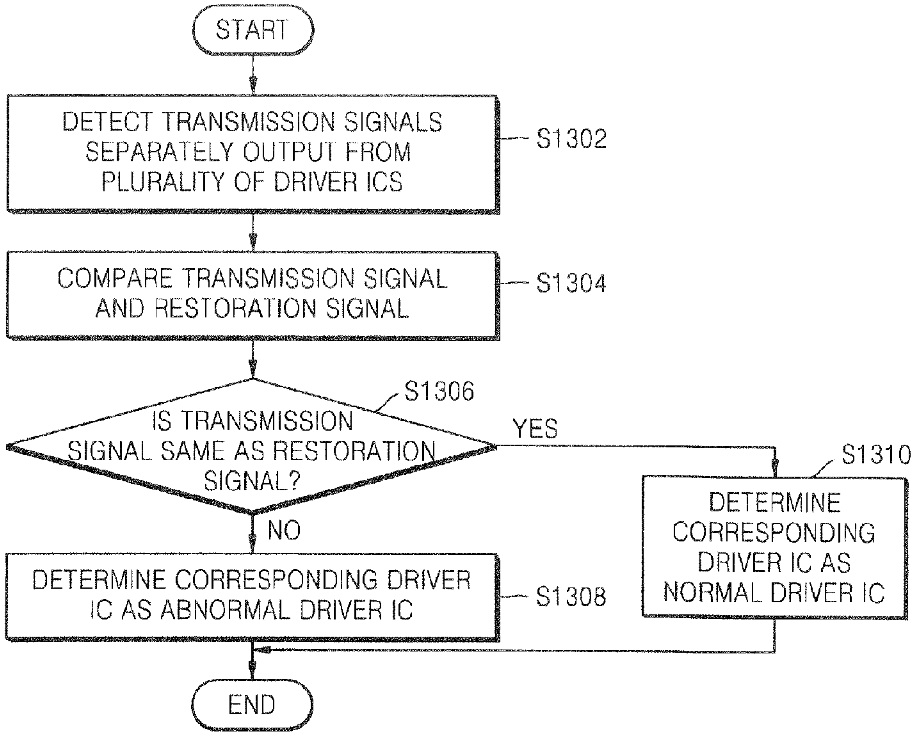
FIG. 13 is a flowchart of an abnormal driver IC detection operation, according to an embodiment of the present invention.

FIG. 13 is a flowchart of the abnormal driver IC detection operation of FIG. 12, according to an embodiment of the present invention.

Referring to FIG. 13, initially, transmission signals separately output from a plurality of driver ICs are detected (S1302). The transmission signals may be enable signals sequentially transmitted from subsequent driver ICs by using a cascade method, in response to a first control signal.

Then, the detected transmission signals and restoration signals are compared with respect to the plurality of driver ICs (S1304). If a transmission signal and a restoration signal of a driver IC are the same (S1306), the driver IC is determined as a normal driver IC (S1310). Otherwise, if a transmission signal and a restoration signal of a driver IC are not the same (S1306), the driver IC is determined as an abnormal driver IC (S1308). The abnormal driver IC detection operation illustrated in FIG. 13 may be performed in each of the plurality of driver ICs.

Referring back to FIG. 12, if the abnormal driver IC is detected in operation S1208, a restoration signal is output to an output terminal of the abnormal driver IC (S1210).

Figure 14:
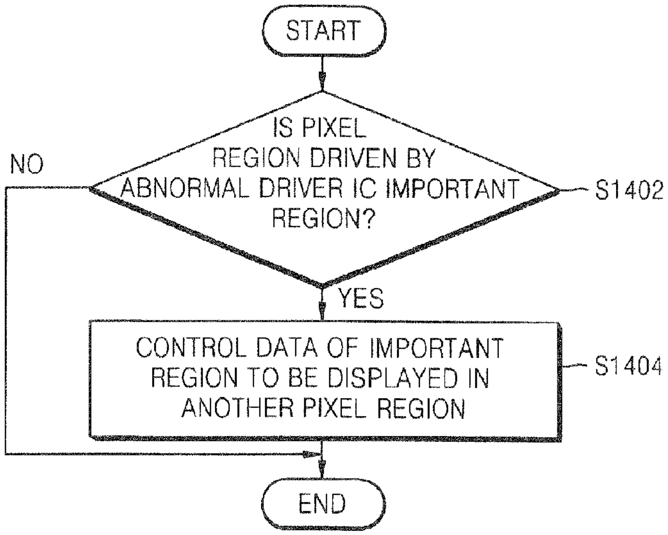
FIG. 14 is a flowchart of a substitution display operation according to an embodiment of the present invention.

FIG. 14 is a flowchart of a substitution display operation according to an embodiment of the present invention.

According to the current embodiment, data to be displayed in a pixel region driven by an abnormal driver IC is displayed in a pixel region driven by at least one normal driver IC other than the abnormal driver IC. In this case, the data to be displayed in the pixel region driven by the abnormal driver IC may be displayed in another pixel region only if the pixel region driven by the abnormal driver IC is an important region.

Referring to FIG. 14, if an abnormal driver IC is detected in operation S1208 illustrated in FIG. 12, it is determined whether a pixel region driven by the abnormal driver IC is an important region (S1402). Information regarding important regions may be previously stored.

Then, if the pixel region driven by the abnormal driver IC is an important region (S1402), data of the important region is controlled to be displayed in another pixel region driven by at least one normal driver IC (S1404). In this case, the other pixel region driven by at least one normal driver IC may be a non-important region.

As described above, according to the present invention, although one of a plurality of driver ICs connected in a cascade manner has an error, transmission signals are transmitted to subsequent driver ICs by using a restoration signal. Accordingly, the range of pixels that operate abnormally when a driver IC has an error may be minimized.

Also, when a driver IC for driving pixels corresponding to an important region has an error, data of the important region may be displayed in another pixel region and thus important data may be stably provided to a user.

While the present invention has been particularly shown and described with reference to exemplary embodiments thereof, it will be understood by one of ordinary skill in the art that various changes in form and details may be made therein without departing from the spirit and scope of the invention as defined by the following claims. The exemplary embodiments should be considered in a descriptive sense only and not for purposes of limitation. Therefore, the scope of the invention is defined not by the detailed description of the invention but by the following claims, and all differences within the scope will be construed as being included in the present invention.

What is claimed is:

1. A display driving apparatus, comprising:

a plurality of driver integrated circuits (ICs) connected in a cascade manner, to display images in a plurality of pixels and transmit transmission signals by using the cascade manner; a first driver IC of the plurality of driver ICs, responding to a first control signal input to the first driver IC, applying the transmission signal to a subsequent driver IC of the plurality of driver ICs;

a restoration signal generation unit generating first restoration signals synchronized with the transmission signals for the plurality of driver ICs;

a timing control unit comprising an error detection unit detecting an error among the driver ICs on a basis of the first restoration signals and the transmission signals from the driver ICs to determine a driver IC associated with the detected error as an abnormal driver IC;

a restoration signal output unit having a plurality of restoration signal output lines connected to the plurality of driver ICs, providing a second restoration signal to an output terminal of the abnormal driver IC while the restoration signal output lines connected to the driver ICs other than the abnormal driver IC are set at a high impedance state;

a substitution display control unit controlling to display image data of a region of pixels driven by the abnormal driver IC in a pixel region driven by at least one of the driver ICs other than the abnormal driver IC, when the region of pixels driven by the abnormal driver IC is determined as an assigned region.

2. The apparatus of claim 1, the error detection unit comprises:

a transmission signal detection unit detecting the transmission signals separately output from the plurality of driver ICs; and a comparison unit comparing the detected transmission signals and the restoration signals to detect the driver IC associated with the detected error, wherein the comparison unit determines by determining the transmission signal and the restoration signal are different from each other.

3. The apparatus of claim 1, further comprising a timing generation unit generating and applying the first control signal to the first driver IC, wherein the timing generation unit generates the first control signal based on the vertical synchronization signal and the horizontal synchronization signal.

4. The apparatus of claim 3, wherein the restoration signal generation unit generates the restoration signals further based on previously stored driving information representing an operation environment of the display driving apparatus, and the display driving apparatus further comprises a register for storing the driving information.

5. The apparatus of claim 1, the first control signal is a horizontal synchronization start signal.

6. The apparatus of claim 1, further comprising a cascade direction changing unit changing a cascade direction of the plurality of driver ICs.

7. A display apparatus, comprising:

a display unit comprising a plurality of pixels each comprising at least one light emitting element and a pixel circuit;

a timing generation unit generating and outputting a first control signal;

a driver circuit unit comprising a plurality of driver integrated circuits (ICs) connected in a cascade manner, to display images in the plurality of pixels, and transmit transmission signals by using the cascade manner; a first driver IC of the plurality of driver ICs, responding to the first control signal input to the first driver IC, applying the transmission signal to a subsequent driver IC of the plurality of driver ICs; the display unit and the pixels being divided into a plurality of regions, each of the regions corresponding to a different one of the driver ICs;

a restoration signal generation unit generating first restoration signals synchronized with the transmission signals of the plurality of driver ICs;

a timing control unit comprising an error detection unit detecting an error among the driver ICs on a basis of the first restoration signals and the transmission signals from the driver ICs to determine a driver IC associated with the detected error as an abnormal driver IC;

a restoration signal output unit having a plurality of restoration signal output lines connected to the plurality of driver ICs, providing a second restoration signal to an output terminal of the abnormal driver IC while the restoration signal output lines connected to the driver ICs other than the abnormal driver IC are set at a high impedance state; and a substitution display control unit controlling to display image data of a region of pixels driven by the abnormal driver IC in a pixel region driven by at least one of the driver ICs other than the abnormal driver IC, when the region of pixels driven by the abnormal driver IC is determined as an assigned region.

8. The apparatus of claim 7, the first control signal being generated by the timing generation unit based on the vertical synchronization signal and the horizontal synchronization signal, the restoration signal is generated by the restoration signal generation unit based on a combination of a vertical synchronization signal, a horizontal synchronization signal, and the first control signal.

9. The apparatus of claim 8, the restoration signals being generated by the restoration signal generation unit further based on previously stored driving information representing an operation environment of the display apparatus, and the display apparatus further comprises a register for storing the driving information.

10. The apparatus of claim 7, the error detection unit comprises:

a transmission signal detection unit detecting the transmission signals separately output from the plurality of driver ICs; and a comparison unit comparing the detected transmission signals and the restoration signals to detect among the driver ICs the error defined as a difference between a transmission signal and a restoration signal and determine the driver IC associated with the error as the abnormal driver IC.

11. The apparatus of claim 7, the first control signal is a horizontal synchronization start signal.

12. The apparatus of claim 7, further comprising a cascade direction changing unit changing a cascade direction of the plurality of driver ICs.

13. A method of driving a display apparatus, comprising:

providing the display apparatus that includes a plurality of driver integrated circuits (ICs) connected in a cascade manner, displays images in a plurality of pixels, and transmit transmission signals by using a cascade method, responding to application of a first control signal to a first driver IC of the plurality of driver ICs by applying a transmission signal from the first driver IC to a subsequent driver IC, in which the pixels being divided into a plurality of regions, each of the regions being driven by a different one of the driver ICs, generating a plurality of first restoration signals synchronized with the transmission signals of the plurality of driver ICs;

detecting a driver IC associated with an error by an error detection unit within a timing control unit using the first restoration signals and the transmission signals and determining the driver IC associated with the detected error as an abnormal driver IC; and providing a second restoration signal to an output terminal of the abnormal driver IC while restoration signal output lines connected to the driver ICs other than the abnormal driver IC are set at a high impedance state controlling to display image data of a region of pixels driven by the abnormal driver IC in a pixel region driven by at least one of the driver ICs other than the abnormal driver IC, when the region of pixels driven by the abnormal driver IC is determined as an assigned region.

14. The method of claim 13, the detecting of the abnormal driver IC comprises:

detecting the transmission signals separately output from the plurality of driver ICs; and comparing the detected transmission signals and the restoration signals to detect the abnormal driver IC, wherein the comparing of the detected transmission signals comprises determining a driver IC of which a transmission signal and a restoration signal are different from each other, as the abnormal driver IC.

15. The method of claim 13, further comprising generating and applying the first control signal to the first driver IC, the generating and applying of the first control signal comprises generating the first control signal based on the vertical synchronization signal and the horizontal synchronization signal.

16. The method of claim 13, the generating of the restoration signals comprises generating the restoration signals further based on previously stored driving information representing an operation environment of the display apparatus.

17. The method of claim 13, further comprising controlling display signals of the abnormal driver IC to be output by at least one normal driver IC other than the abnormal driver IC.

18. The method of claim 13, the first control signal is a horizontal synchronization start signal.

19. The method of claim 13, further comprising changing a cascade direction of the plurality of driver ICs.

20. The apparatus of claim 1, the restoration signal is generated by the restoration signal generation unit based on a combination of a vertical synchronization signal, a horizontal synchronization signal, and the first control signal.

* * * * *